United States Patent [19]
Sherman

[11] Patent Number: 5,443,162
[45] Date of Patent: Aug. 22, 1995

[54] HIGH CAPACITY HIGH PRESSURE FEEDING

[75] Inventor: Michael I. Sherman, Glens Falls, N.Y.

[73] Assignee: Glentech Inc., Glens Falls, N.Y.

[21] Appl. No.: 33,547

[22] Filed: Mar. 18, 1993

[51] Int. Cl.6 .................. B07B 1/06; B65G 53/08
[52] U.S. Cl. .................. 209/274; 209/380; 209/393; 210/420; 210/432; 406/63
[58] Field of Search .......... 209/235, 393, 394, 395, 209/172.5, 380, 273, 274, 281; 406/19, 52, 63, 105, 121, 138; 210/251, 354, 391, 411, 420, 432

[56] References Cited

U.S. PATENT DOCUMENTS

| | | | |
|---|---|---|---|
| 3,360,911 | 1/1968 | Sweeney | 209/393 X |
| 3,777,893 | 12/1973 | Ginaven | 209/393 X |
| 4,082,368 | 4/1978 | Funk | 302/14 |
| 4,187,043 | 2/1980 | Kindersley | 406/105 |
| 4,338,049 | 7/1982 | RIchter et al. | 406/63 |
| 4,354,777 | 10/1982 | Richter et al. | 406/63 |
| 4,372,711 | 2/1983 | Richter et al. | 406/105 X |
| 4,396,503 | 8/1983 | Schmidt | 209/393 |
| 4,415,296 | 11/1983 | Funk | 406/19 |
| 4,430,029 | 2/1984 | Richter et al. | 406/63 |
| 4,516,887 | 5/1985 | Richter et al. | 406/63 |
| 5,236,285 | 8/1993 | Prough | 406/63 X |
| 5,236,286 | 8/1993 | Prough | 406/63 X |

FOREIGN PATENT DOCUMENTS

| | | |
|---|---|---|
| 089164 | 9/1993 | European Pat. Off. . |
| 324949 | 7/1970 | Sweden . |

Primary Examiner—William E. Terrell
Assistant Examiner—Tuan N. Nguyen
Attorney, Agent, or Firm—Nixon & Vanderhye

[57] ABSTRACT

The production capacity of a conventional high pressure feeder having a pocketed rotor with a slotted screen at the low pressure outlet port is significantly increased by constructing the screen so that its arcuate bars have a width much less than normal, and thus a much greater open area of the screen is provided. Structural integrity is maintained by providing a reinforcing bar extending transverse to the arcuate screen bars, typically attached at the convex mid-point area. The screen is formed from a cast metal body, and the width of the arcuate screen bars is typically between about 0.14–0.20 inches.

20 Claims, 3 Drawing Sheets

HIGH CAPACITY HIGH PRESSURE FEEDING

BACKGROUND AND SUMMARY OF THE INVENTION

The high pressure feeder, or transfer device, is one of the most basic and important components of the Kamyr continuous pulping system. The high pressure feeder is used to transfer steamed wood chips in a liquid (typically white liquor) from low pressure to the top of the continuous digester, at high pressure. A typical high pressure transfer device comprises a pocketed rotor, a housing, a screen, and pump separably connected to the housing. The pocketed rotor has a plurality of through going pockets, each having opposite end openings which function as both inlets and outlets depending upon the angular position of the rotor. The housing encloses the rotor and has an exterior periphery with first through fourth ports disposed around the exterior periphery for registry with the inlets to and outlets from the pockets. The first and third ports are opposite, and the second and fourth ports are opposite, and the first and second ports may be adjacent in the direction of rotation.

In a conventional high pressure feeder screen means are dispose in the third port for screening particles above a predetermined size out of the liquid passing through the third port, and a low pressure pump is connected to the third port to provide the suction for sucking liquid through the third port. A high pressure pump is operatively connected to the second port to provide the flow of liquid under high pressure through the second port. Normally the first port is on the top, and the third port on the bottom, the first port connected to the chips chute, and the fourth port connected to the top of the digester.

While conventional high pressure feeders have functioned very well over the decades they have been in use, there have been relatively few substantive changes to the high pressure feeder over the decades. It has been known that the filling efficiency of the conventional high pressure feeder is approximately 50 to 65% on some chip furnishes, and that is significantly lower than is desired, but to date few significant inroads have been made in substantially increasing that efficiency.

To a large extent, the efficiency of the high pressure feeder is dictated by its ability to obtain the chip chute circulation which carries the chips from the chute into the pockets of the rotor. The chip chute circulation is throttled on the suction side of the chip chute circulation pump the the pressure drop across the screen at the third port. The filling efficiency is also limited by the open area of the slotted screen at the third port. It is necessary that the arcuate bars making up the slotted screen have sufficient thickness and width to ensure that they are strong enough so that they do not easily break. A broken screen bar causes costly down time by requiring a high pressure feeder to be replaced, and high pressure feeders repairs and rebuilds are relatively expensive. The width of the slot is typically a compromise between having the maximum open area for the screen and at the same time avoiding an excess of chips passing through the screen and causing difficulties in the chip chute pump.

According to the present invention a simple arrangement is provided for increasing the open screen area. Despite its simplicity, the invention can result in an increase in filling efficiency of the high pressure feeder of about 10 to 50%, which in turn means an increase in the feeding capacity of a given size of high pressure feeder at practically no cost. The invention also is so simple and straight forward that existing high pressure feeders can easily be retrofit, again with only a small cost if done during normal maintenance. Alternatively or additionally, the larger open screen area will allow the high pressure feeder to be run at a lower angular speed (rpm) while still maintaining the existing feed rate, thereby increasing the life of the feeder, or both slightly longer life and slightly higher feed capacity can be obtained by utilizing the invention. For example, the angular speed can be reduced from about 11 rpm to about 7 to 9 rpm, with no drop off in feeder capacity, or the angular speed could be reduced to say, 10 rpm, with an increase in feeder capacity.

According to one aspect of the present invention, a slotted screen for a high pressure feeder, per se, is provided. The slotted screen comprises: An integral metal body comprising a frame and a plurality of bars. The frame having first and third opposite sides, and second and fourth opposite sides. The plurality of bars comprising a first plurality of arcuate bars extending between the first and third sides of the frame, generally evenly spaced from each other to define generally uniformly dimensioned slots therebetween. And, the plurality of bars further comprising at least one reinforcing bar extending between the second and fourth sides of the frame, substantially transverse to the arcuate bars, and reinforcing the first plurality of bars.

The first plurality of arcuate bars preferably comprise concave and convex mid-point areas, and the at least one reinforcing bar preferably comprises a single reinforcing bar engaging the convex mid-point area of the arcuate first plurality of bars, to reinforce the arcuate bars thereat. The integral metal body may comprise a cast metal body including the arcuate bars and the reinforcing bar. The arcuate bars typically have a width of about 0.29–0.32 inches, and define slots therebetween having a width of about 0.31–0.34 inches. A plurality of threaded apertures are formed in the first and third sides for receiving fastening bolts, and the reinforcing bar typically has a width of about one to two and one-half inches.

According to another aspect of the present invention, a high pressure transfer device for transferring a slurry containing particles, the vast majority of which are above a first size, is provided. The transfer device comprises the following components: A pocketed rotor containing a plurality of through going pockets, the rotor rotatable about an axis, and the pockets having opposite end openings which function as both inlets and outlets depending upon the angular position of the rotor. A housing enclosing the rotor, the housing having an exterior periphery and first through fourth ports disposed around the exterior periphery thereof for registry with the inlets to and outlets from the through going pockets, the first port being opposite the third port, and the second port opposite the fourth port and the first and second ports are adjacent in the direction of rotation of the pocket. Means for mounting the rotor in the housing for rotation with respect to the ports about the given axis of rotation, and in a first direction. Screen means disposed in the third port, for screening particles above the first size out of the liquid passing through the third port. And, means for providing a suction source to the third port to suck liquid through the screen means when a pocket is rotated into operative association with the third port. And, wherein the screen means comprises: An integral metal body comprising a frame and a plurality of bars. The frame having first and third opposite sides, and second and fourth opposite sides. The plurality of bars comprising a first plurality of arcuate bars extending between the first and third sides of the frame, substantially evenly spaced from each other to defining substantially uniformly dimensioned slots therebetween. And the plurality of bars further comprising at least one reinforcing bar extending between the second and fourth sides of the frame, and reinforcing the first plurality of bars.

According to another aspect of the present invention, a method of increasing the filling efficiency of a high pressure transfer device is provided. The high pressure transfer device comprises: A pocketed rotor containing a plurality of through going pockets, and rotatable about an axis, the pockets having opposite end openings which function as both inlets and outlets depending upon the angular position of the rotor, and a housing enclosing the rotor and having an exterior periphery and first through fourth ports disposed around the exterior periphery for registry with the inlets to and outlets from the through going pockets, the first port being opposite the third port, and the second port opposite the fourth port, and the first and second ports adjacent in the direction of rotation of the pocket, the rotor rotatable in the housing about an axis of rotation, in a first direction, and an original screen disposed in the third port for screening out particles above a predetermined size from the liquid passing through the third port, the screen having a frame having opposite first and third sides, and opposite the first and third sides, the bars having a first width, and defining between them slots have a second width which is less than the predetermined size of particles to be screened thereby, and the screen devoid of bars extending between the second and fourth sides of the frame. The method of the invention comprises the steps of: (a) Providing a replacement screen having a frame with opposite first and third sides and opposite second and fourth sides, and a plurality of bars extending between the first and third sides, the bars having a third width much less than the first width, and defining between them slots having the second width, so that many more bars and slots are provided between the second and fourth sides than for the original screen, so that the percentage of the open area in the replacement screen is significantly greater than in the original screen, and at least one reinforcing bar extends between the second and fourth sides for reinforcing the bars extending between the first and third sides. And, (b) removing the original screen from the third port of the rotor housing, and replacing it with the replacement screen.

Step (a) is practiced so as to provide the third width size compared to the first width, and the width of the at least one reinforcing bar, so that the percentage of open area of the replacement screen compared to the original screen is about 40–60% greater. For example the third width may be about one-half the first width, yet the slotted screen still has sufficient structural integrity because of the reinforcing bar.

The rotor with the original screen in the third port of the housing is rotated at a first angular speed during use, and has a first capacity, and there is the further step (c) of rotating the rotor with the replacement screen in the third port of the housing at a second angular speed, significantly less than the first angular speed, so that it has a second capacity, substantially the same as, or slightly greater than, the first capacity. Alternatively, the step (c) may be practiced by rotating the rotor with the replacement screen in the third port of the housing at a second angular speed, substantially the same as, or slightly lower than, the first angular speed, so that it has a second capacity significantly greater than the first capacity.

It is the primary object of the present invention to provide substantially increased production capacity, or life for a given production capacity, of a high pressure feeder associated with a chip feeding system for a Kamyr continuous digester, in a simple manner. This and other objects of the invention will become clear from an inspection of a detailed description of the invention and from the appended claims.

DETAILED DESCRIPTION OF THE DRAWINGS

Figure 1:
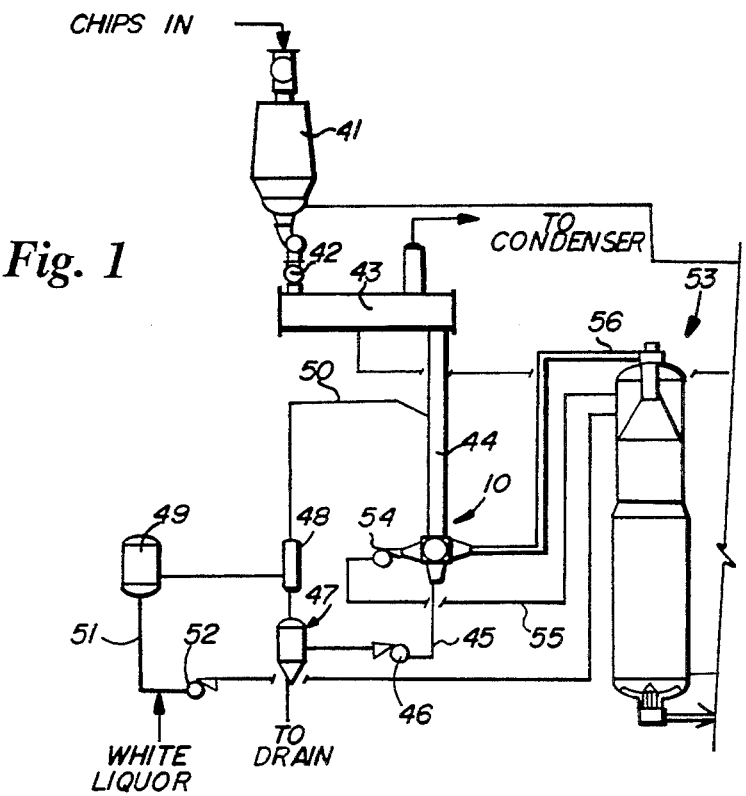
FIG. 1 is a schematic view of an exemplary high pressure feeder according to the present invention in a feeding system associated with a continuous digester.
Figure 2:
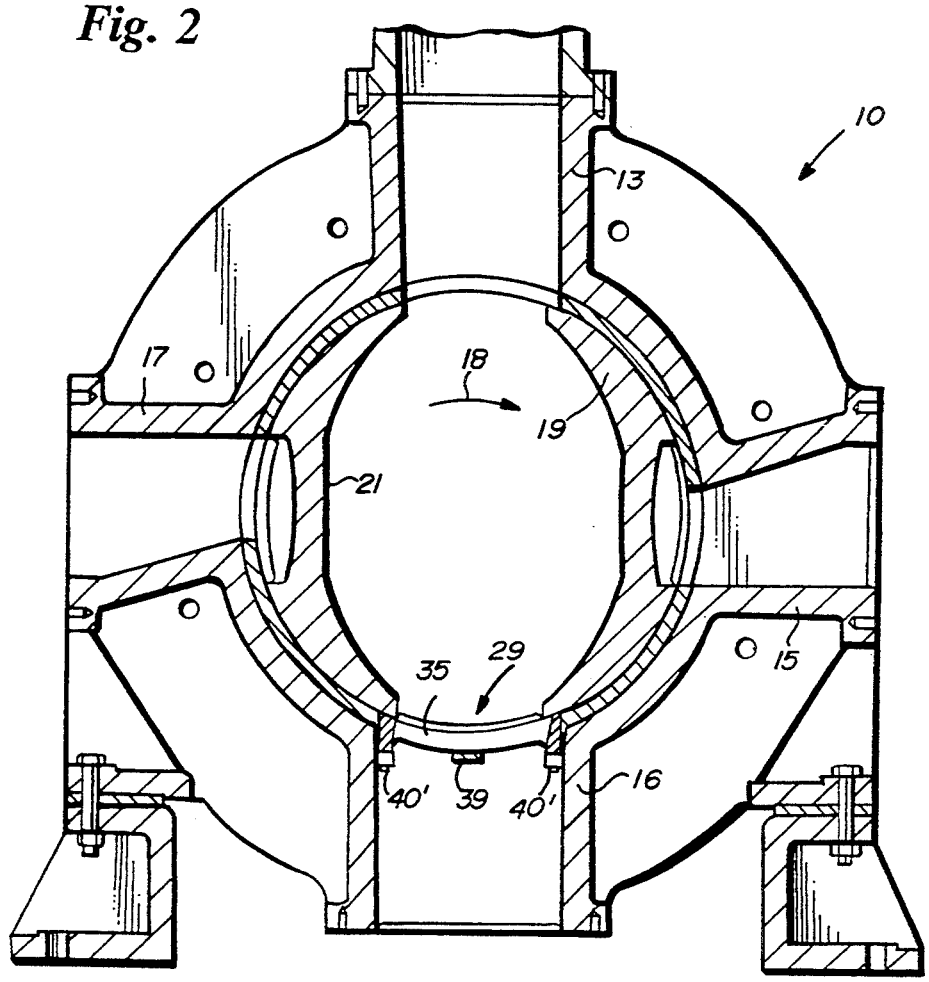
FIG. 2 is a schematic end cross-sectional view showing exemplary high pressure feeder, with improved screen, according to the present invention.

FIG. 1 illustrates the position of an exemplary high pressure feeder 10 according to the invention in a conventional feed system for a Kamyr continuous digester. The high pressure transfer device 10 is shown more clearly in FIGS. 2 and 3, and includes a first port 13 of a housing having a sleeve 14, the sleeve 14 being distinct from the housing as shown in FIG. 2, but described herewith as part of the housing. The housing also has a second port 15, a third port 16, and a fourth port 17 disposed at approximately 90° intervals in the direction of rotation 18 of a pocketed rotor 19 disposed within the housing 14. The port 13 is a low pressure inlet, port 15 is a high pressure outlet, port 16 is a low pressure outlet, and port 17 is a high pressure inlet. Pockets 21 are provided within the rotor 19.

The third port 16 has screen means 29 disposed in third port 16 for screening particles above the first predetermined size out of the liquid passing through the third port 16.

Figure 3:
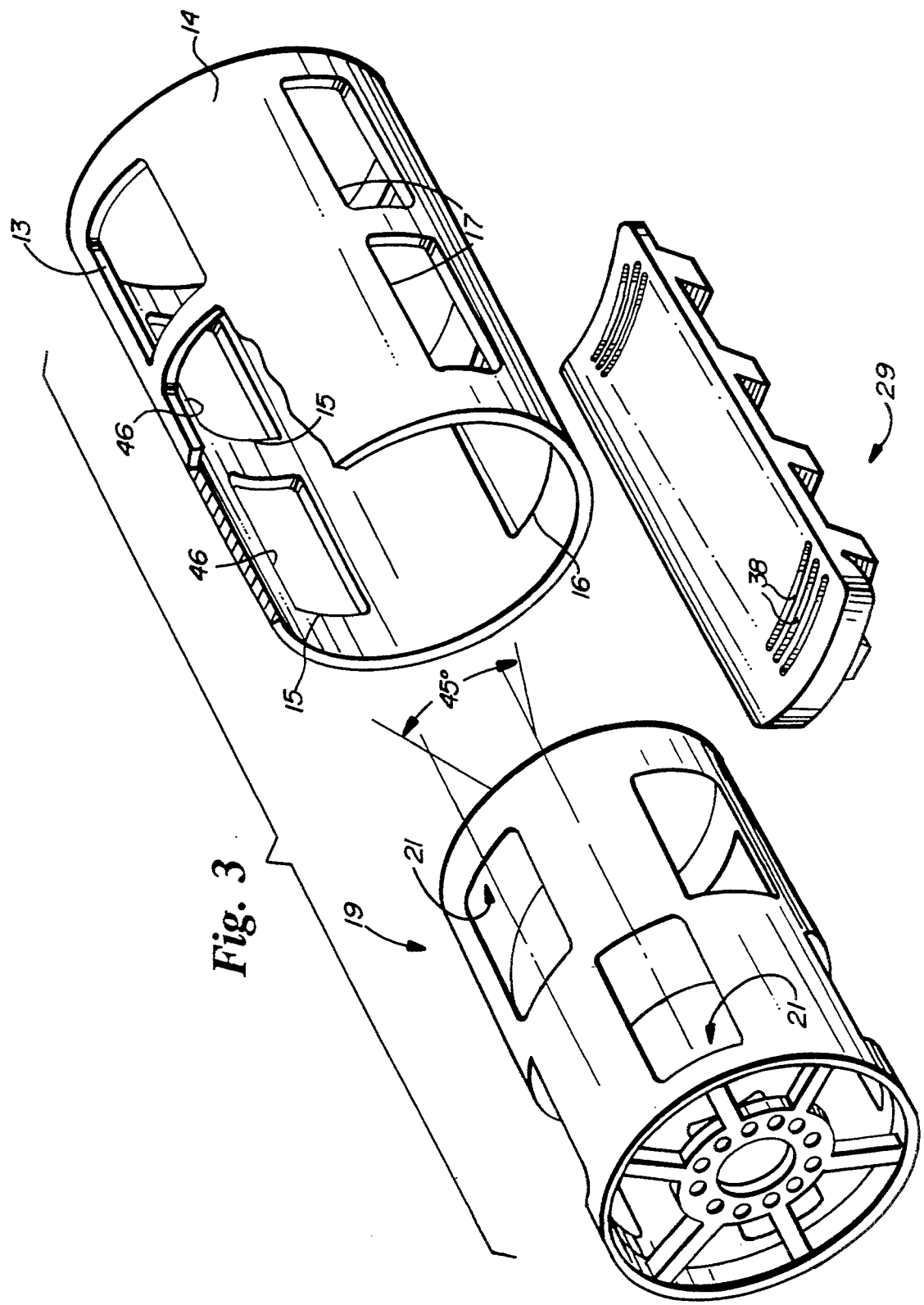
FIG. 3 is an exploded perspective view illustrating certain parts of the feeder of FIGS. 1 and 2.

As seen in FIG. 3, the rotor 19 typically has four diametrically through-going pockets, and the rotor 19 is mounted for rotation about a shaft defining an axis of rotation (not shown), the shaft for rotating the rotor 19 typically being horizontal.

Figure 4:
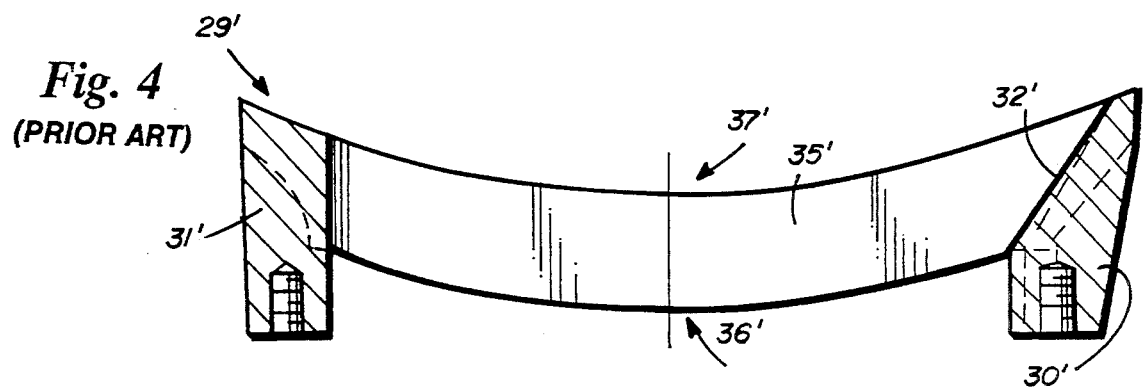
FIG. 4 is a longitudinal cross-sectional view of a prior art screen.
Figure 5:
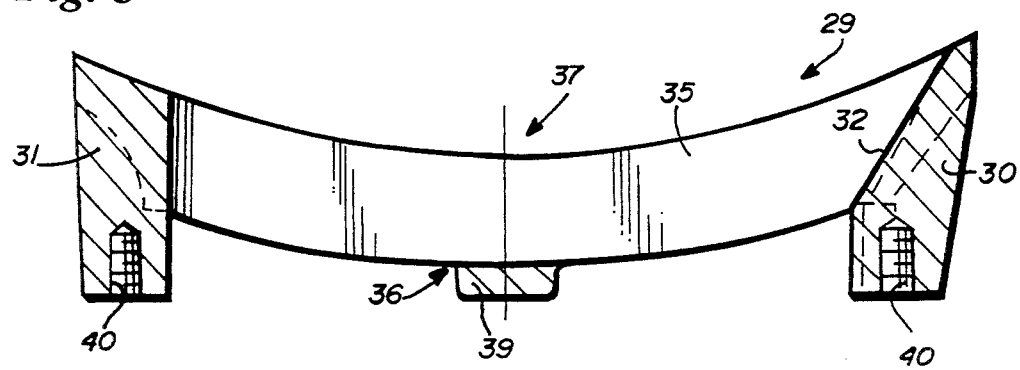
FIG. 5 is a longitudinal cross-sectional view of an exemplary screen according to the invention.
Figure 6:
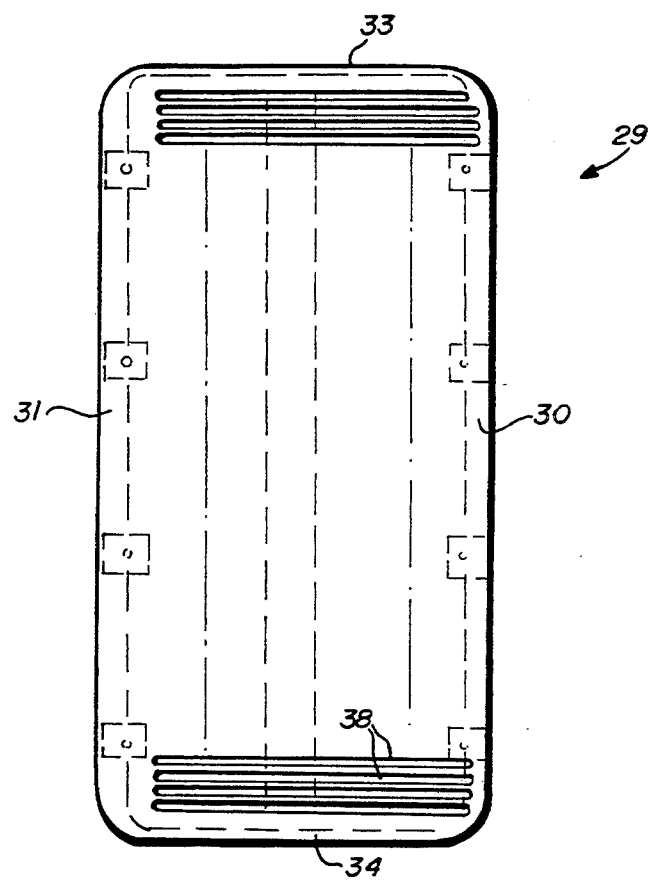
FIG. 6 is a top plan view of the screen of FIG. 5.

What has been described so far is conventional except for the particular screen 29 according to the invention. For clarity of illustration, FIGS. 4 and 5 compare a screen 29 according to the invention (FIG. 5) with a prior art screen 29'. In FIGS. 4 and 5 all components are shown by the same reference numeral only in the case of FIG. 4 followed by a "(')". Various other components of the screen 29 may also be seen with respect to FIGS. 3 and 6.

The screen 29 includes an integral metal body comprising a frame and a plurality of bars. The frame is defined by first and third opposite sides 30, 31. The side 30 having a sloped lead in surface 32 thereof and designed to be the "upstream" or leading edge as far as the direction of rotation 18 of the rotor 19 is concerned, so that the chips slurry first starts to flow through the screen 29 past the sloped surface 32. The frame also comprises second and fourth opposite sides 33, 34 respectively (see FIGS. 3 and 6).

Figure 7:
FIG. 7 is a longitudinal cross-sectional view of a typical screen bar.

The integral metal body forming the screen 29 also comprises a plurality of arcuate bars 35 having a convex mid-point area 36, and a concave mid-point area 37. Obviously the degree of arc of the arcuate bars 35 is approximately the same as the arcuate exterior of the rotor 19. The bars 35 are spaced from each other between the second and fourth sides 33, 34 so as to define a plurality of slots 38 therebetween (see FIGS. 3 and 6). As is conventional, the slots 38 normally slightly increase in width (e.g., about 0.5 mm) from side 30 to side 31. Also, the bars 35 are typically tapered, having a slightly greater width at the top than at the bottom (see FIG. 7), the distance from top to bottom being about 2.5 inches.

The difference between the design according to the invention of FIG. 5 and the design of the prior art of FIG. 4, is in the width of the bars 35 (that is in their dimension in the direction between sides 33, 34). The normal width of bars 35' is about 0.29–0.32 inches (in conventional high pressure feeders), but according to the invention the width of the bars 35 is substantially less, e.g. about one-half that of the conventional bars 35'. For example the bars 35 according to the invention can have a width of about 0.14–0.20 inches. This enables one to have the same width slots as in conventional screens, yet about 40–60% more open area, without sacrificing screen strength. This is a phenomenal advance considering the extremely small advances that have been made over the decades in filling efficiency, since this new screen 29 can result in an increase in capacity of the high pressure transfer device 10 of about 10–50%; or, by slowing down the rotor, maintain the same capacity and significantly increase rotor life.

It is possible to achieve the open area that is achieved according to the invention while not sacrificing strength (which would result in broken bars, and thus significant down time for the digester, and expensive replacement of screens) by providing at least one reinforcing bar, reinforcing the arcuate bars 35. The at least one reinforcing bar is illustrated as a single stiffening bar 39 in FIGS. 5 and 6, being integral with the rest of the screen 29 at the convex mid-point 36. The width of the bar 39 is preferably about two inches, and its thickness about one to two and one-half inches. It must be wide enough so as to provide effective stiffening action, but narrow enough so that it does not itself substantially decrease the open area of the screen.

Preferably, the entire screen 29, including the sides 30, 31, 33, 34, the arcuate bars 35, and the reinforcing bar 39, are cast as an integral piece of metal (e.g., iron or steel), although alternatively they could be formed by welding or bolting components together.

While the term "bar" is used to describe the reinforcing element 39, it is to be understood that it can have any cross section or other configuration desired, as long as it successfully performs its reinforcing (stiffening) function for the bars 35, so that they do not prematurely break.

Note, also, that the screen 29 includes a plurality of internally threaded openings 40, typically formed in the first and third sides 30, 31 of the frame, which receive bolts 40' (see FIG. 2) for holding the screen in place connected inside the port 16.

FIG. 1 shows the high pressure device 10 according to the invention in association with a typical feed system for a Kamyr continuous digester. A chips bin 41 is connected by a low pressure feeder to a horizontal steaming vessel 43, in turn connected to a chip chute 44 which is connected to the low pressure inlet port 13 of the high pressure feeder 10. The low pressure recirculating line 45 extends outwardly from the third port 16 of the high pressure feeder 10, the pump 46 in line 45 comprising means for providing a suction source to the third port 16 to suck liquid through the screen means 29 when a pocket 21 is rotated into operative association with the third port 16.

The chip chute pump 46 is connected by a sand separator 47, in line drainer 48, and level tank 49 to the recirculation line 50 which leads to the chip chute 44. The level tank 49 is in turn connected to line 51 leading to the make up white liquor pump 52.

The high pressure pump 54 is connected to the fourth port 17, while the line 55 provides recirculating liquor to the pump 54, and the line 56—connected to the second port 15—circulate the chips and liquor to the top of the vessel 53. The vessel 53 may be either an impregnation vessel, or the continuous digester itself.

The screen 29 according to the present invention may be easily retrofit into existing high pressure feeders. All one need do is to unbolt the bolts 40' associated with the conventional screen 29', put the screen 29 in its place, and reinsert the bolts 40' into the openings 40. In this way, the percentage of open area of the replacement screen compared to the original screen is about 40–60% greater, resulting in a substantially commensurate increase in the capacity of the high pressure feeder 10, or allowing one to reduce the angular speed of the high pressure feeder rotor 19 so that it wears less. For example, the angular speed can be reduced from 11 r.p.m. to about 7–9 r.p.m. without a decrease in capacity of the high pressure feeder 10, or the angular speed may be maintained substantially the same and the capacity significantly increased.

It will thus be seen that according to the present invention in a simple manner the capacity or life of the high pressure feeder has been substantially increased. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of increasing the filling efficiency of a high pressure transfer device comprising a pocketed rotor containing a plurality of through going pockets, and rotatable about an axis, the pockets having opposite end openings which function as both inlets and outlets depending upon the angular position of the rotor, and a housing enclosing the rotor and having an exterior periphery and first through fourth ports disposed around the exterior periphery for registry with the inlets to and outlets from the through going pockets, the first port being opposite the third port, and the second port opposite the fourth port, and the first and second ports adjacent in the direction of rotation of the pocket, the rotor rotatable in the housing about an axis of rotation, in a first direction, and an original screen disposed in the third port or screening out particles above a predetermined size from the liquid passing through the third port, the original screen having a frame having opposite first and third sides, and opposite the second and fourth sides, and the original screen having bars extending between the first and third sides of the frame and having a first width, and defining between them slots having a second width which is less than the predetermined size of particles to be screened thereby, and the screen devoid of bars extending between the second and fourth sides of the frame, said method comprising the steps off
  (a) providing a replacement screen having a frame with opposite first and third sides and opposite second and fourth sides, and a plurality of bars extending between the first and third sides, the bars having a third width much less than said first width, and defining between them slots having substantially said second width, so that many more bars and slots are provided between the second and fourth sides than for the original screen, so that the percentage of the open area in the replacement screen is significantly greater than in the original screen, and at least one reinforcing bar extends between the second and fourth sides for reinforcing the bars extending between the first and third sides; and
  (b) removing the original screen from the third port of the rotor housing, and replacing it with the replacement screen.

2. A method as recited in claim 1 wherein step (a) is practiced so as to provide the third width size compared to the first width, and the width of the at least one reinforcing bar, so that the percentage of open area of the replacement screen compared to the original screen is about 40-60% greater.

3. A method as recited in claim 1 wherein step (a) is practiced so as to provide the third width about one-half the first width.

4. A method as recited in claim 1 wherein the rotor with the original screen in the third port of the housing is rotated at a first angular speed during use, and has a first capacity; and comprising the further step (c) of rotating the rotor with the replacement screen in the third port of the housing at a second angular speed, significantly less than the first angular speed, so that it has a second capacity, substantially the same as, or slightly greater than, the first capacity.

5. A method as recited in claim 1 wherein the rotor with the original screen in the third port of the housing is rotated at a first angular speed during use, and has a first capacity; and comprising the further step (c) of rotating the rotor with the replacement screen in the third port of the housing at a second angular speed, substantially the same as, or slightly lower than, the first angular speed, so that it has a second capacity significantly greater than the first capacity.

6. A method as recited in claim 1 wherein step (a) is practiced to provide a third width of between about 0.14-0.20 inches.

7. A slotted screen for a high pressure feeder comprising:
  an integral metal body comprising a frame and a plurality of bars;
  said frame having first and third opposite sides, and second and fourth opposite sides;
  said plurality of bars comprising a first plurality of arcuate bars extending between said first and third sides of said frame, having concave surfaces, and midpoint areas opposite said concave surfaces; said bars generally evenly spaced from each other to define generally uniformly dimensioned slots therebetween; and
  said plurality of bars further comprising a single reinforcing bar extending between said second and fourth sides of said frame, substantially transverse to said arcuate bars, and reinforcing said first plurality of bars, said reinforcing bar engaging said arcuate bars at said midpoint areas opposite said concave surfaces.

8. A screen as recited in claim 7 wherein said first plurality of arcuate bars also comprise convex surfaces including said midpoint areas, said single reinforcing bar engaging the convex midpoint areas of said arcuate first plurality of bars, to reinforce said arcuate bars thereat.

9. A screen as recited in claim 7 wherein said integral metal body comprises a cast metal body, including said arcuate bars and said reinforcing bar.

10. A screen as recited in claim 7 wherein said arcuate bars each have a width of between about 0.14-0.20 inches, and define slots therebetween having a width of between about 0.29-0.35 inches.

11. A screen as recited in claim 7 further comprising a plurality of threaded apertures formed in said first and third sides for receiving fastening bolts.

12. A screen as recited in claim 10 wherein said integral metal body comprises a cast metal body, including said arcuate bars and said reinforcing bar.

13. A screen as recited in claim 10 wherein each of said slots increases in width about 0.5 mm from one end thereof to the other.

14. A screen as recited in claim 10 wherein said single reinforcing bar has a width of between about one to two and one-half inches.

15. A high pressure transfer device for transferring a slurry containing particles, the vast majority of which are above a first size, said device comprising:
  (a) a pocketed rotor containing a plurality of through going pockets, said rotor rotatable about an axis, and said pockets having opposite end openings which function as both inlets and outlets depending upon the angular position of the rotor;
  (b) a housing enclosing said rotor, said housing having an exterior periphery and first through fourth ports disposed around the exterior periphery thereof for registry with the inlets to and outlets from said through going pockets, said first port being opposite said third port, and said second port opposite said fourth port and the first and second ports are adjacent in the direction of rotation of the pocket;
  (c) means for mounting said rotor in said housing for rotation with respect to said ports about said given axis of rotation, and in a first direction;
  (d) screen means disposed in said third port, for screen particles above said first size out of the liquid passing through said third port; and
  (e) means for providing a suction source to said third port to suck liquid through said screen mens when a pocket is rotated into operative association with said third port; and wherein said screen means comprises: an integral metal body comprising a frame and a plurality of bars; said frame having first and third opposite sides, and second and fourth opposite sides; said plurality of bars comprising a first plurality of arcuate bars extending between said first and third sides of said frame, having concave surfaces forming portions thereof closest to said rotor pockets, generally evenly spaced from each other to define generally uniformly dimensioned slots therebetween; and said plurality of bars further comprising at least one reinforcing bar extending between said second and fourth sides of said frame, and reinforcing said first plurality of bars, said at least one reinforcing bar engaging said arcuate bars opposite said concave surfaces.

16. A high pressure transfer device as recited in claim 15 wherein said screen first plurality of arcuate bars also comprise convex mid-point areas; and wherein said at least one reinforcing bar comprises a single reinforcing bar engaging the convex mid-point areas of said arcuate first plurality of bars, to reinforce the arcuate bars thereat.

17. A high pressure transfer device as recited in claim 15 wherein said screen integral metal body comprises a cast metal body, including said arcuate bars and said at least one reinforcing bar.

18. A high pressure transfer device as recited in claim 15 wherein said arcuate bars each have the width of between about 0.14–0.20 inches, define slots therebetween having a width of between about 0.29–0.35 inches.

19. A high pressure transfer device as recited in claim 15 wherein said screen further comprises a plurality of threaded apertures formed in said first and third sides for receiving fastening bolts, and further comprising fastening bolts connecting said screens, via said threaded apertures, to said housing at said third port.

20. A high pressure transfer device as recited in claim 18 wherein said at least one reinforcing bar comprises a single reinforcing bar having a width of between one-two and one-half inches.

* * * * *